United States Patent
Palmer et al.

(10) Patent No.: US 11,680,486 B2
(45) Date of Patent: Jun. 20, 2023

(54) ELECTRIC TURBOMACHINE

(71) Applicant: ROLLS-ROYCE plc, London (GB)

(72) Inventors: Chloe J. Palmer, Derby (GB); Vladimir A. Shirokov, Derby (GB)

(73) Assignee: Rolls-Royce plc, London (GB)

(*) Notice: Subject to any disclaimer, the term of this patent is extended or adjusted under 35 U.S.C. 154(b) by 132 days.

(21) Appl. No.: 16/779,712

(22) Filed: Feb. 3, 2020

(65) Prior Publication Data

US 2020/0263545 A1 Aug. 20, 2020

(30) Foreign Application Priority Data

Feb. 15, 2019 (GB) .................................... 1902095

(51) Int. Cl.

| | |
|---|---|
| *F01D 15/10* | (2006.01) |
| *F01D 1/26* | (2006.01) |
| *F01D 15/12* | (2006.01) |
| *F04D 19/02* | (2006.01) |
| *F02K 3/072* | (2006.01) |
| *H02K 7/18* | (2006.01) |

(52) U.S. Cl.
CPC ............... *F01D 1/26* (2013.01); *F01D 15/10* (2013.01); *F01D 15/12* (2013.01); *F02K 3/072* (2013.01); *F04D 19/024* (2013.01); *H02K 7/1823* (2013.01); *F05D 2250/44* (2013.01); *F05D 2260/40311* (2013.01)

(58) Field of Classification Search
CPC ....... F01D 15/10; F01D 15/12; H02K 7/1823; F02K 3/072
See application file for complete search history.

(56) References Cited

U.S. PATENT DOCUMENTS

| | | | |
|---|---|---|---|
| 2,413,225 A | 12/1946 | Griffith | |
| 3,705,775 A | 12/1972 | Christian | |
| 7,199,484 B2* | 4/2007 | Brashears | F03B 17/061 290/54 |
| 8,464,511 B1* | 6/2013 | Ribarov | H02K 7/14 60/226.1 |
| 9,866,094 B2* | 1/2018 | Huang | F03D 3/064 |
| 10,700,580 B2* | 6/2020 | Palmer | B64D 27/24 |
| 10,794,617 B2* | 10/2020 | Moxon | H01M 10/6556 |
| 2009/0289516 A1* | 11/2009 | Hopewell | F02K 3/072 60/801 |
| 2010/0326050 A1* | 12/2010 | Schilling | H02K 16/02 60/268 |
| 2011/0024567 A1 | 2/2011 | Blackwelder et al. | |

(Continued)

OTHER PUBLICATIONS

Great Britain search report dated Aug. 13, 2019, issued in GB Patent Application No. 1902095.7.

(Continued)

*Primary Examiner* — Courtney D Heinle
*Assistant Examiner* — Andrew J Marien
(74) *Attorney, Agent, or Firm* — Shumaker & Sieffert, P.A.

(57) ABSTRACT

Turbomachinery comprising first and second sets of rotors configured to operate on a working fluid. The machinery further comprises first and second sets of electric machines coupled to the respective first and second rotors, and a coupling arrangement arranged to couple adjacent rotors of the first and second rotor sets to provide for fixed ratio, contra-rotation of the first and second rotor sets.

9 Claims, 10 Drawing Sheets

(56) References Cited

U.S. PATENT DOCUMENTS

| | | | |
|---|---|---|---|
| 2012/0326539 A1* | 12/2012 | Webster | H02K 16/00 310/46 |
| 2013/0174533 A1* | 7/2013 | Ribarov | B64C 11/48 415/60 |
| 2014/0212299 A1 | 7/2014 | Edwards et al. | |
| 2016/0160867 A1 | 6/2016 | Gehlot | |
| 2017/0159665 A1 | 6/2017 | Bergamini et al. | |
| 2020/0023982 A1* | 1/2020 | Kupratis | F02C 7/36 |
| 2020/0340406 A1* | 10/2020 | Maljean | H02K 7/116 |

OTHER PUBLICATIONS

European search report dated Jul. 8, 2020, issued in EP Patent Application No. 20152654.8.
Response to Extended European Search Report from counterpart EP Application No. 20152654.8 dated Jul. 17, 2020, filed Jan. 6, 2021, 39 pgs.

\* cited by examiner

ELECTRIC TURBOMACHINE

CROSS-REFERENCE TO RELATED APPLICATIONS

This application is based upon and claims the benefit of priority from British Patent Application No. GB 1902095.7, filed on 15 Feb. 2019, the entire contents of which are incorporated by reference.

BACKGROUND

Technical Field

The present disclosure concerns an electric turbomachine.

Description of the Related Art

Turbomachinery describes machines that transfer energy between a rotor and a fluid. Consequently, this includes equipment that acts on working fluids to drive or compress them (such as compressors, fans and pumps), as well as equipment that is acted upon by working fluids, to expand the fluid and drive the rotor (such as turbines).

One example includes gas turbine engine compressors. In gas turbine engine compressors, as in other types of turbomachinery, it is often desirable to provide multiple stages to efficiently compress the working fluid. Ideally, each of these stages would act at a different rotational speed to adjacent stages. One method of providing for different speeds is to provide multiple shafts (or "spools") for different stages. However, as stage numbers increase, having a separate shaft for each stage becomes impractical.

Conventional turbines and compressors comprise multiple rotors which turn in use, with each stage being separated by a static stator. It is desirable for high efficiency and power density to provide for rotors having high circumferential velocities compared to the stators.

It has been proposed to provide "contra-rotating compressors" in which the stators are omitted. Instead, a first set of rotors turns in a first direction, and a second set of rotors turns in an opposite direction. The two sets are interposed, such that rotors of the first and second rotor set alternate with each other. This increases the relative velocity of the rotors, thereby increasing the power density and efficiency. However, the mechanical arrangement of such compressors is complex, which has prevented such compressor types from seeing widespread use. One such prior arrangement is described in U.S. Pat. No. 2,413,225.

It has also been proposed to drive contra-rotating compressors electrically (see for example US patent publication US2016160867). However, again, if different speeds are required of the separate rotors, complexity increases with such electrical designs in view of the large number of separate electric motors, and their associated controllers.

Control of such systems is also difficult. Whether the contra-rotating machinery is powered mechanically by separate shafts or electrically by separate electric motors, it can be difficult to ensure that the two sets of counter-rotating blades share the load equally.

SUMMARY

According to a first aspect there is provided turbomachinery comprising: first and second sets of rotors configured to operate on a working fluid; first and second sets of electric machines coupled to the respective first and second rotors; and a coupling arrangement arranged to couple adjacent rotors of the first and second rotor sets to provide for fixed ratio, contra-rotation of the first and second rotor sets.

Advantageously, a fixed ratio of rotor speeds can be provided between the first and second rotor sets, which can provide for improved control and more predictable operation. On the other hand, the majority of the torque imposed by interaction of the rotors and the working fluid is reacted by the electric machines, and so the load imposed on the coupling arrangement can be relatively low.

The turbomachinery may comprise one of a compressor, a pump, a fan, and a turbine.

For example, the turbomachinery may comprise a contra-rotating fan or a contra-rotating compressor, and the electric machines may comprise electric motors. Alternatively, the turbomachinery may comprise a turbine, and the electric machines may comprise electric generators.

The coupling arrangement may comprise a mechanical gearing arrangement, which mechanically couples rotors of the first set of rotors with an adjacent rotor of the second set of rotors.

For example, the coupling arrangement may comprise a contra-rotating epicyclic gearbox, such as a star gearbox. Alternatively, the coupling arrangement may comprise a ring gear mounted to each of the first and second rotors, and a pinion gear arranged to mesh with the ring gears.

Alternatively, the coupling arrangement may comprise a magnetic gearbox configured to provide for counter-rotation between adjacent rotors.

The first and second sets of electric machines may be coupled to a common motor or generator controller. Advantageously, since the first and second sets of electric machines are coupled via the coupling arrangement, only a single motor or generator controller is required, since the first and second electric machines are held in a known relative position. This means that the motor or generator controller can operate both sets of electric machines on the basis of a single position control signal. Consequently, cost, complexity and weight is substantially reduced, while maintaining the advantages of contra-rotating turbomachinery.

Each electric machine may comprise a radial flux electric machine comprising a stator and a rotor, and the stator of each electric machine may be provided radially inward of the rotor. Advantageously, the stators of the electric machines can be provided on a central shaft, which can be easily removed for maintenance.

The rotors of adjacent electric machines may comprise a different number of magnetic poles relative to one another. Consequently, both contra-rotation and different velocities can be provided by the different rotor stages, while having a single motor controller for the electric machines. Consequently, high power density can be provided, while the total weight of the compressor is minimised.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
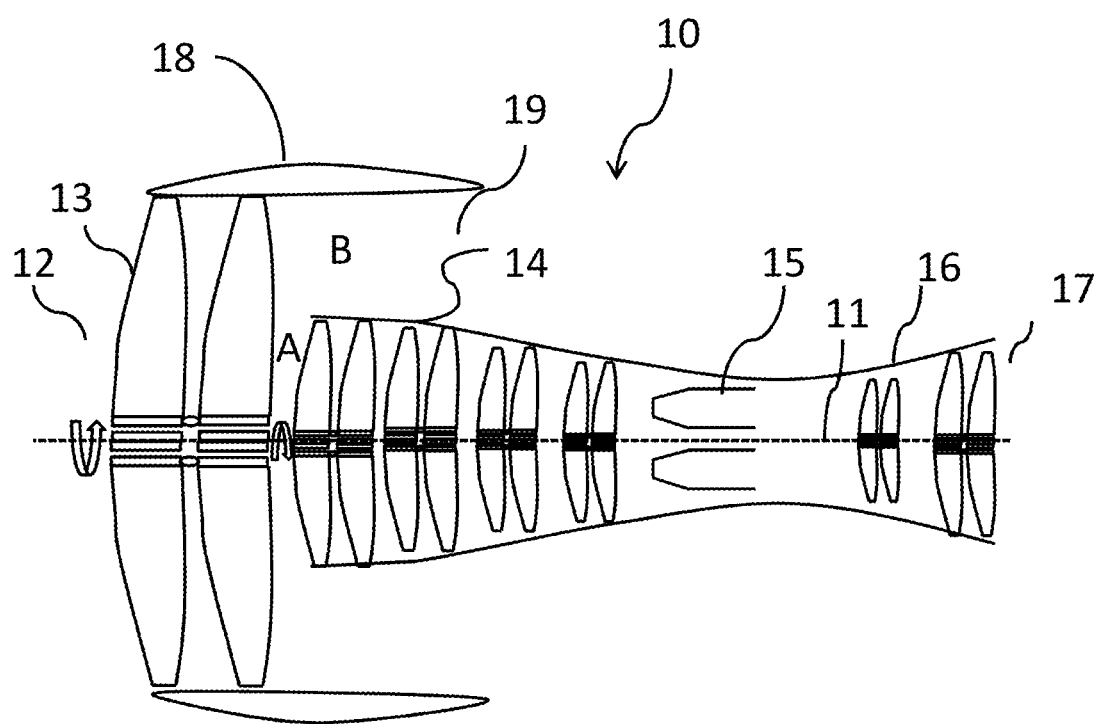
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, a compressor 14, combustion equipment 15, a turbine 16, and a core exhaust nozzle 17. A nacelle 18 generally surrounds the engine 10 and defines both the intake 12 and a fan exhaust nozzle 19.

The gas turbine engine 10 works so that air entering the intake 12 is accelerated by the fan 13 to produce two air flows: a first air flow A into the intermediate pressure compressor 14 and a second air flow B which passes through a bypass duct to provide propulsive thrust. The compressor 14 compresses the air flow directed into it before delivering that air to the combustion equipment 15 where it is mixed with fuel and the mixture combusted. The resultant hot combustion products then expand through, and thereby drive the turbine 16 before being exhausted through the nozzle 17 to provide additional propulsive thrust. The turbine 16 drives the compressor 14 electrically, as will become clear below.

Figure 2:
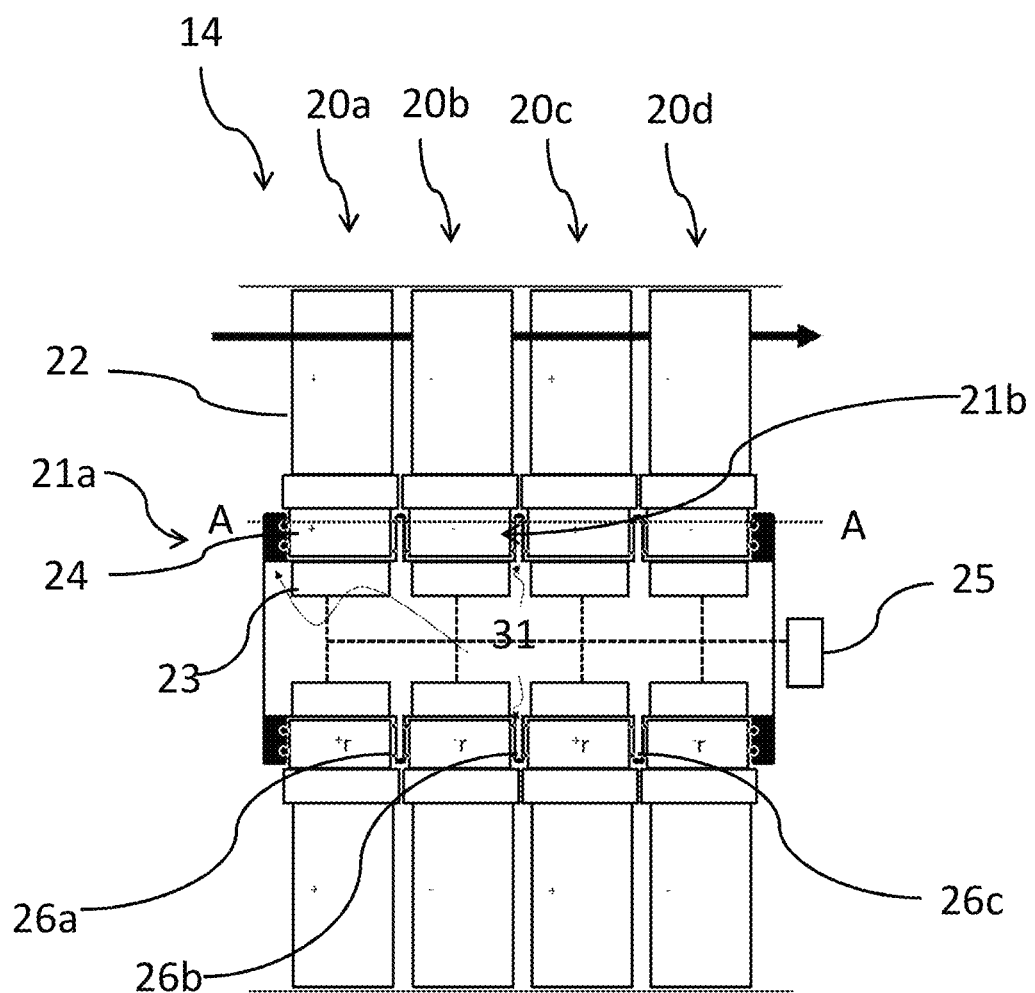
FIG. 2 is a sectional side view of a compressor of the gas turbine engine of FIG. 1.

Turning now to FIG. 2, the compressor 14 is shown in more detail. As can be seen, the compressor 14 comprises a plurality of compressor stages, four of which (stages 20a-d) are shown in FIG. 2. Each compressor stage 20a-d comprises a compressor rotor 22, and a corresponding electrical machine 21a, 21b. Bearings 31 are provided at either end of the compressor 14, and optionally at intermediate stages, to allow for rotation of the rotors 22.

The compressor stages 20a-d can be divided into first and second sets, with stages of the first and second sets alternating with one another. In this example, stages 20a and 20c form the first set of compressor stages, while stages 20b and 20d form the second set of compressor stages. As can be seen from FIG. 2, the first and second sets are configured to rotate in opposite directions to compress air flowing through the compressor 14, i.e. the compressor rotors are generally oppositely "handed", i.e. are curved in opposite directions to direct air toward the right as shown in FIG. 2, when rotated in their respective directions. For example, the first set of rotors 20a, 20c are configured to rotate clockwise when viewed from the front of the engine (as indicated by the "+" signs on the respective rotors), while the second set of rotors 20b, 20d are configured to rotate counter-clockwise (as indicated by the "−" signs on the respective rotors).

Each compressor rotor 22 of each stage 20 is coupled to the corresponding electrical machine 21 of that stage. The electric machines 21 are configured to act as motors, to drive the respective rotors 22. Each electric machine comprises a stator 23, which comprises electrical windings (not shown) and a core, as is conventional. The stators may be multi-phase (e.g. three phase), with multiple windings for each stator. Each electric machine 21 also comprises an electric machine rotor 24, which is configured to rotate when the electric machine is in operation. In this example, the electric machine rotor 24 is provided radially outward of the stator 23, in a "radial flux" configuration, with the stator 23 and rotor 24 in the same radial plane. The electric machine rotor 24 comprises either electromagnets, permanent magnets, or a salient, soft magnetic body, such that a rotating electric field in the stator 23 causes rotation of the machine rotor 24. The electric machine rotor 24 is coupled to the corresponding compressor rotor 22, such that the electric machine 21 causes rotation of the corresponding compressor rotor 22. Consequently, first and second sets of electrical machines can also be defined, which form part of the first and second stages.

The windings of each electric machine stator 23 are coupled to a motor controller 25. The motor controller 25 comprises an inverter, which provides an alternating electrical current to the windings of each stator 23. As can be seen in FIG. 2, the windings of each stator of both the first and second sets of electrical machines, and indeed, in this embodiment, all of the electrical machines, are connected to the same motor controller 25, either in series or in parallel. This means that only a single motor controller 25 is required, in spite of the large numbers of motors, and in spite of the contra-rotation of the motors. Ordinarily, a separate controller would be required for each electrical machine, to ensure that each controller could track the rotor position separately, to ensure that stator flux is injected at the appropriate time. However, in the present disclosure, a coupling arrangement is provided, which negates the need for separate machine controllers, thereby saving significant cost and weight.

Adjacent stages of the compressor 14 are coupled to a coupling arrangement, such that synchronous contra-rotation is provided. In the present example, three coupling arrangements 26a, 26b, 26c are required, in order to couple stage 20a to stage 20b, stage 20b to stage 20c, and stage 20c to stage 20d respectively.

Figure 3:
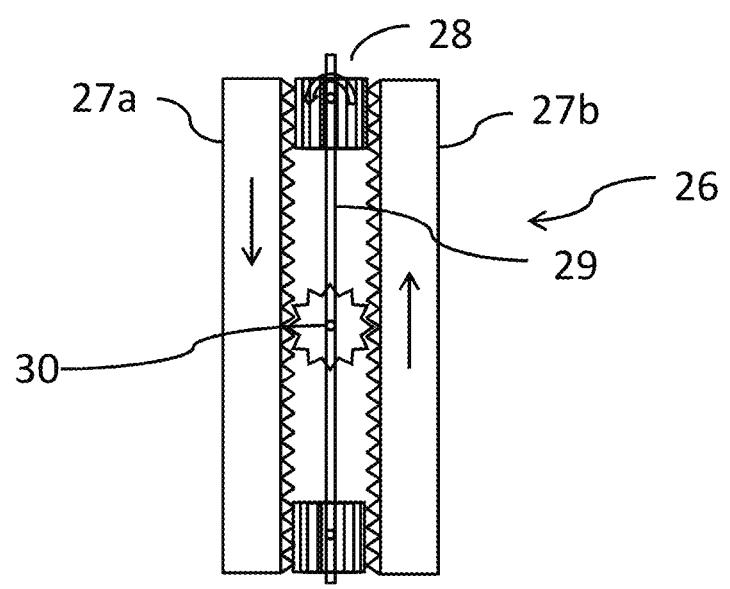
FIG. 3 is a view along A-A of a coupling arrangement of the compressor of FIG. 2.

FIG. 3 shows one of the coupling arrangements in more detail. As can be seen, the coupling arrangement comprises first and second toothed ring gears 27a, 27b, which are mounted to the electric machine rotors 24 of the respective stages 20a, 20b. A pinion gear 28 is provided, which meshes with both the toothed ring gears 27a, 27b. The pinion gear 28 is held in place by a mounting rail 29, and is allowed to rotate in place by a bearing 30. Consequently, clockwise movement (i.e. down in FIG. 3) of the machine rotor to which the toothed ring gear 27a is attached, is translated to anti-clockwise rotation of the machine rotor to which the toothed ring gear 27b is attached, via the pinion gear 28.

Consequently, the stages 20a-d are allowed to counter-rotate relative to one another, but are kept in a fixed relationship. Depending on the gearing, the relationship may be 1:1 (i.e. the stages rotate at the same speed, but counter-rotating), or the rotors could be made to rotate with a fixed gear relationship. Typically, it may be desirable for the stages at the downstream end to rotate at a higher speed that the stages at the upstream end, so the toothed ring gears 27a, 27b and pinion gear 28 may have a desired number of teeth to provide the required gear ratio. For example, the pinion gear may have two axially spaced sets of teeth, with a first set meshing with the toothed ring gear 27a, and a second set having a different diameter meshing with the toothed ring gear 27b, alternatively, additional idler gears may be provided to provide the desired gear ratio.

Figure 4:
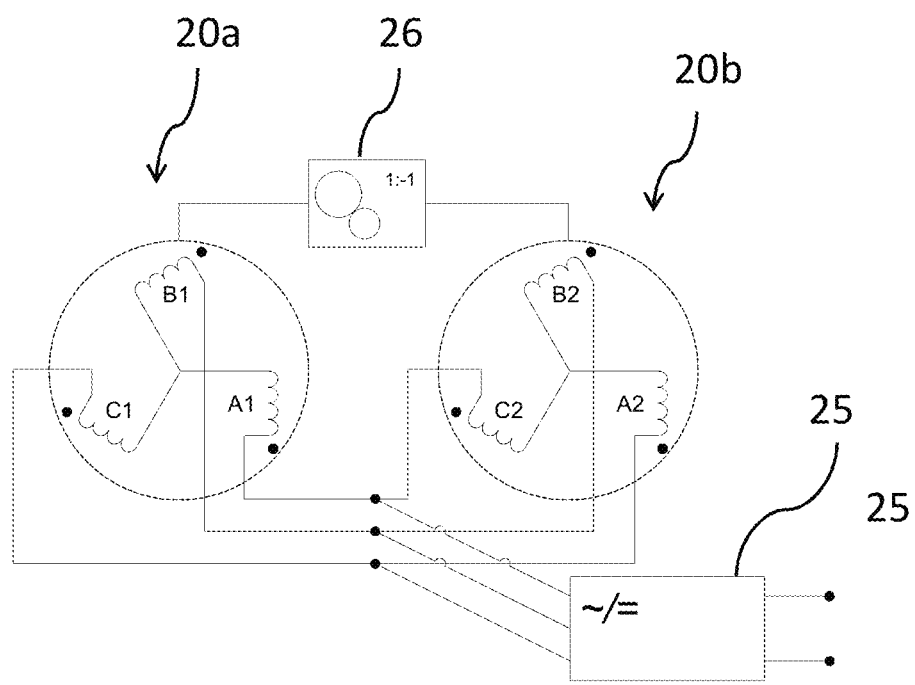
FIG. 4 is a schematic showing electrical connections between electric machines of part of the compressor of FIG. 2, and a motor controller.

In view of the coupling arrangement, the position of each of the rotors 20a-d relative to the other rotors 20a-d is known and fixed. Consequently, the controller 25 can control all of the rotors at once, whilst only tracking a single rotor of one electrical machine.

Where the stages 20a-d are geared by the coupling arrangement with a 1:1 ratio, and the electric machine comprises three phases, the electric machines can be wired as shown in FIG. 4, to provide contra-rotation of the machines, with the same controller.

FIG. 4 shows the electrical configuration for the stator windings of two of the electrical machines 21, for adjacent, contra-rotating stages (such as stages 20a, 20b). As can be seen, three electrical phases are provided from the controller 25. The phases of each of the stators (A1, A2, B1, B2, C1, C2) are arranged in an anti-clockwise pattern, with each of the phases connected to a common neutral point. A first electrical phase of the controller 25 is coupled to stator A1 of the electrical machine of the first stage 20a, and is coupled to stator C2 of the electrical machine of the second stage 20a. A second electrical phase of the controller 25 is coupled to stator B1 of the electrical machine of the first stage 20a, and is coupled to stator B2 of the electrical machine of the second stage 20a. A third electrical phase of the controller 25 is coupled to stator C1 of the electrical machine of the first stage 20a, and is coupled to stator A2 of the electrical machine of the second stage 20a. Consequently, the stator windings A and C are swapped for the two electrical machines, such that they rotate in opposite directions, at the same speed. In the embodiment shown, the electric machine stator windings are provided in series. However, as will be understood, the stator windings are the electric machines could instead be wired in parallel.

In practice, the two contra-rotating electrical machines would ordinarily go out of phase, due to the slightly different loads experienced by the two rotors 20a, 20b. However, in view of the coupling arrangement, the phase relationship is maintained, and the two rotors do not go out of synch. It will be appreciated however, that the coupling arrangement does not need to carry the full torque imparted by each rotor, since only the difference in load need be accommodated, since the main torque is taken up by the individual electric motors. Consequently, the coupling arrangement 26 does not have to be capable of reacting the full torque of each rotor, and so can be relatively light weight.

Alternatively, or in addition, the number of rotor poles of the rotors of the electric machines 21 of the different stages could be differed, so that the machines rotate at different speeds, while staying electrically in synch. The gearing of the coupling arrangement 26 would also have to change accordingly. Typically, the gearing and relative number of poles should be an integer multiple. For instance, a first electric machine 21 of the first stage 20a could be provided with sixteen rotor poles and twenty-four stator slots, while a second electric machine 21 of the second stage 20b could be provide with eight rotor poles and twelve stator slots. The coupling arrangement 26 could be arrange to provide a 2:1 gearing ratio, such that the second electric machine rotates at twice the speed of the first electric machine. Again, the stators could be wired as shown in FIG. 4, to obtain counter-rotation. Consequently, different rotational speeds (and so high power density and higher efficiency) could be provided, whilst also providing for counter-rotation, while only requiring a single motor controller.

The stator of the electric machines 21 of subsequent stages 20c, 20d could be arranged in a similar manner, to provide counter-rotation for each stage as desired, as well as providing the required rotational speed difference.

Figure 5:
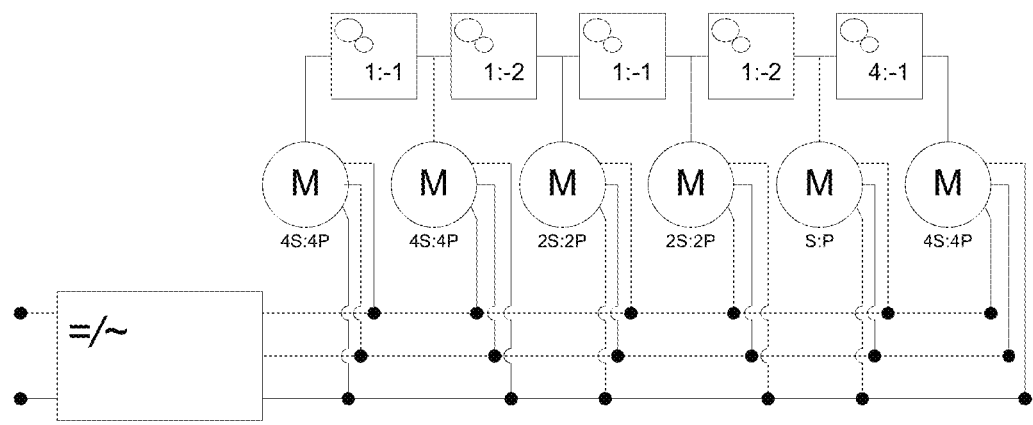
FIG. 5 is a schematic showing alternative electrical connections between electric machines of part of an alternative arrangement.

For example, FIG. 5 shows an electrical arrangement for an alternative compressor 114 having six stages 120a-f. Again, each stage has an associated rotor and electrical machine.

As can be seen, a plurality of electrical machines 121 are provided, one for each stage 120a-f. Each electrical machine has a corresponding number of stator slots ("S" in FIG. 5—i.e. "5" indicates some number of slots, "2S" indicates a twice the amount of slots "5", and so on), and a corresponding number of rotor poles ("P" in FIG. 5—i.e. "P" indicates some number of poles, "2P" indicates twice the amount of poles "P", and so on).

The first electrical machine 121a has 4S slots and 4P poles, with three electrical phases this machine has S/P/3 slots per pole per phase. This is electrically coupled to a motor controller 125.

The second electrical machine 121b also has 4S slots and 4P poles, with three electrical phases this machine has S/P/3 slots per pole per phase. However, this electrical machine 121b is electrically coupled to the controller 125 with two of the phases reversed, such that the second electrical machine 121b rotates in the opposite direction to the first electrical machine 121a. A coupling arrangement 126a similar to that shown in FIG. 3 is provided, which provides a 1:1 gear ratio. Consequently, the second electrical machine 121b rotates at the same speed as the first electrical machine, but in the opposite direction.

The third electrical machine 121c has half the number of slots and half the number of poles of machine 121b, also with three electrical phases, resulting in the same number of slots per pole per phase and general machine characteristic. This electrical machine 121c is electrically coupled to the controller 125 with the phases in the same order as the first electrical machine 121a, such that the third electrical machine 121c rotates in the opposite direction to the second electrical machine 121b to which it is adjacent. A coupling arrangement 126b is provided, which provides a 1:2 gear ratio. Consequently, the third electrical machine 121c rotates at double the mechanical speed as the first and second electric machines 121a, 121b, and in the same direction as the first electric machine 121a, but in the opposite direction to the second, adjacent electric machine 121b. As machine 121c has half the number of poles as machine 121a or 121b, but is spinning at double the mechanical speed, it runs at the same electrical frequency as machines 121a and 121b. With machines 121a, 121b and 121c having the same amount of slots per pole per phase and same general machine characteristic as well as being mechanically synchronised by the coupling arrangement, all three machines operate electrically in phase. Operation at the same electrical frequency and always in phase allows for control by a single controller.

The fourth through sixth electric machines 121d-f are arranged in a similar manner, with each being arranged to counter-rotate relative to their adjacent stage, and each with a desired relative rotational speed, as set by their pole and slot number, and the corresponding gear ratio of the corresponding coupling arrangement. Consequently, machines can have either faster or slower rotors, as is required by the compressor design, where slowing down of the consequent stage is illustrated in 121f.

The compressor 14, 114 consequently provides a highly compact, energy efficient, lightweight turbomachine, suitable for a wide range of applications, such as gas turbine engines.

As will be appreciated, an electrical power source is required to provide electrical power for the motor controller 25, and the electrical machines 21. In the presently described embodiment, the electrical power is provided by the turbine 16 of the gas turbine engine 10.

Figure 6:
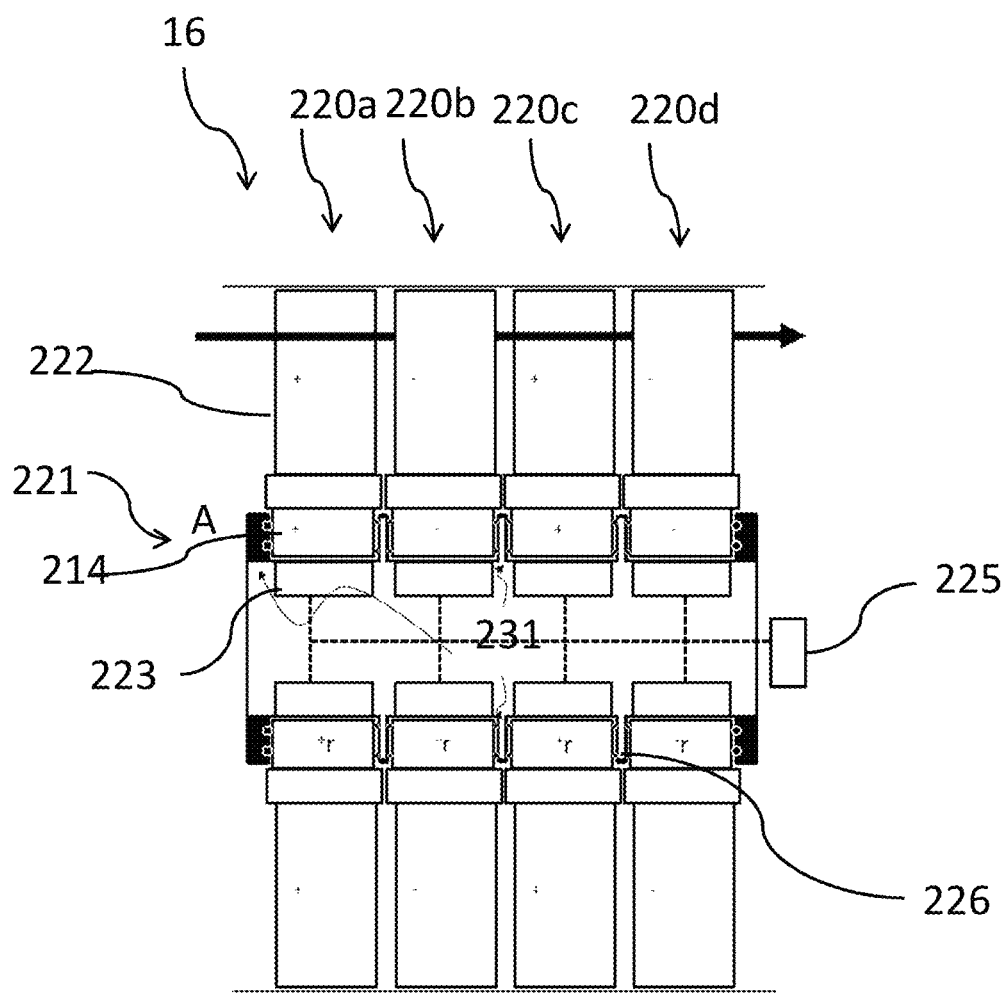
FIG. 6 is a sectional side view of a contra-rotating fan of the gas turbine of FIG. 1.

The turbine 16 is shown in greater detail in FIG. 6. The turbine 16 is similar in principle to the compressor 14, having a plurality of stages 220*a-d*, each comprising a rotor 22 and an associated electric machine 21. In this case however, the rotors 22 are configured to convert high pressure, hot airflow into mechanical power, rather than to generate pressure, and so can be categorised as turbine blades. Again, the turbine rotors 22 are configured to counter-rotate, such that each stage 220*a-d* rotates in an opposite direction to an adjacent stage, and are mounted to bearings 231. Similarly, the electric machines 21 are configured as generators, and so are configured to convert the mechanical power from the turbine rotors 21 to electrical power.

The generators 221 are essentially the same as the motors 21, and could again be radial flux, permanent magnet synchronous AC machines comprising a stator 223 radially inward of a machine rotor 24. Each of the stators has windings, which are wound in a similar manner to the machines 21, with phases of adjacent machines swapped, so that contra-rotating adjacent stages produce electrical power that is synchronised with the other turbines. Again, coupling arrangements 226 are provided to keep the turbines synchronised, and these may be similar to the coupling arrangement 26.

Each generator is coupled to a generator controller in the form of a rectifier 225, which converts the AC waveforms generated by the generators 221 into DC current. The rectifier 225 is coupled to the motor control 25 through a DC power bus, such that the turbine 16 provides power to the compressor 14.

Figure 7:
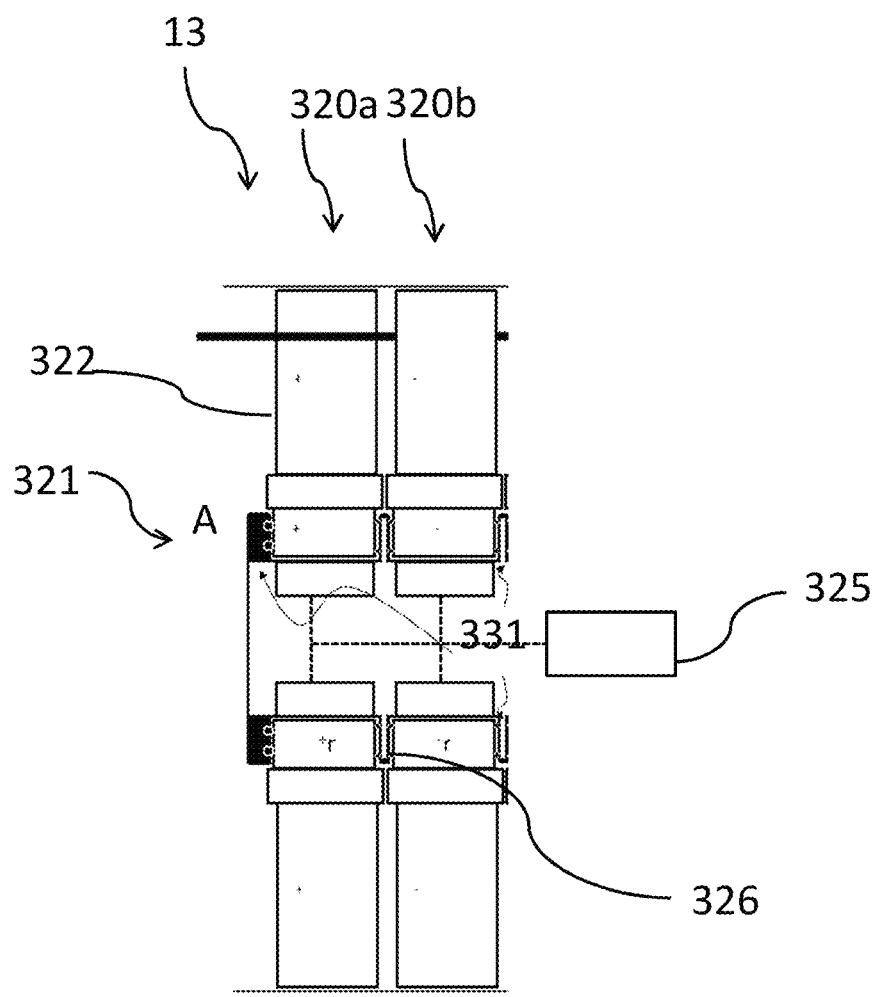
FIG. 7 is a sectional side view of a turbine of the gas turbine engine of FIG. 1.

The gas turbine engine fan 13 is also arranged in a similar manner, with counter-rotating stages powered by electric motors. The fan 13 is shown in more detail in FIG. 7. Again, the electric power is provided by the turbine 16 via the electric generators 221 and rectifier 225 to a common motor controller 326, which provide power to electric motors 321, which drive first and second fan stages 320*a*, 320*b*, each of which comprises a corresponding fan rotor 322. Again, a coupling arrangement 326 is provided, which is similar to the coupling arrangement 26.

The disclosed arrangement could be applied to an electric aircraft propulsor, in which the propulsor is driven by electric motors which are provided with electrical power from one or a combination of a separate gas turbine engine, and an electrical storage device such as a chemical battery.

Figure 8:
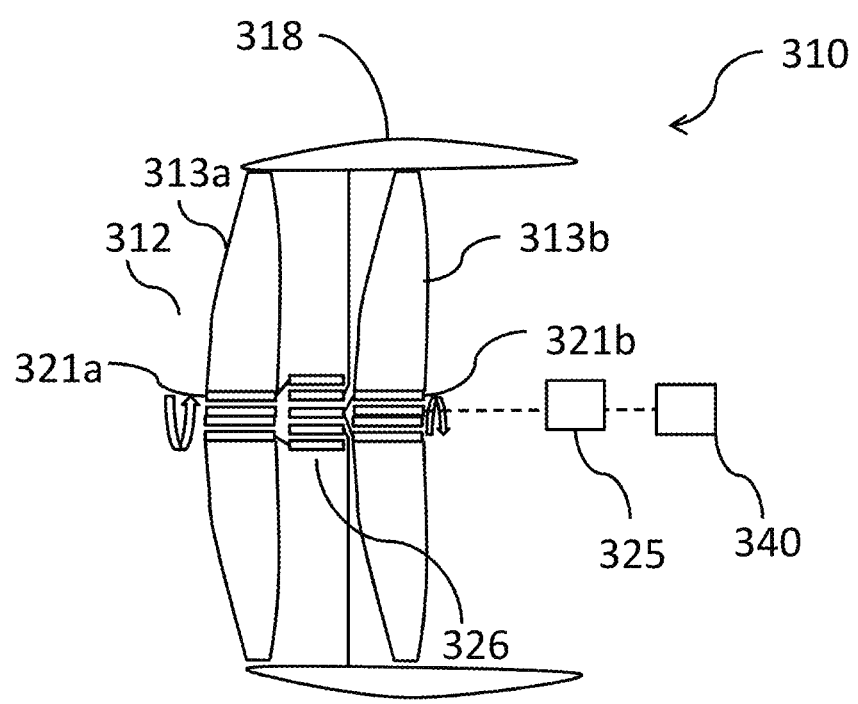
FIG. 8 is a sectional side view of an electric propulsor.

FIG. 8 shows an electric propulsor 310. The electric propulsor comprises a fan comprising first and second fan stages 313*a*, 313*b*. Each fan stage comprises a corresponding fan rotor, and a corresponding electric machine in the form of a respective motor 321*a*, 321*b*. The fan rotor and motors 321*a*, 321*b* are similar to those of the fan 13, and so will not be described in further detail. However, the fan 310 differs in two important respects.

Firstly, the motors 321*a*, 321*b* are provided with power from a separate power stage 340, which may for example comprise a separate combustion engine such as a gas turbine engine, an energy storage device such as a chemical battery, or any other suitable power source. In either case, the motors are provided with electrical power via a common motor controller 325, which is similar to the motor controller 25.

Secondly, the first and second fan stages 313*a*, 313*b* are coupled by a coupling arrangement 326 which differs from the coupling arrangement 26 of previous embodiments.

Figure 9:
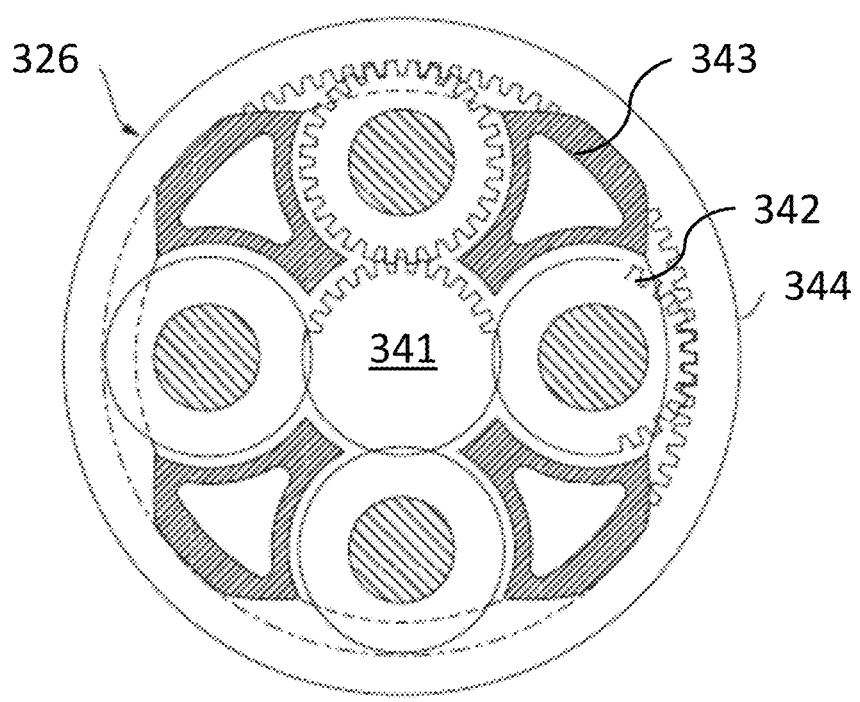
FIG. 9 is a sectional front view of a gearbox for the electric propulsor of FIG. 8.

The coupling arrangement 326 is shown in FIG. 8, and in further detail in FIG. 9. The coupling arrangement is in the form of an epicyclic gearbox, which in the present embodiment takes the form of a single stage, star gearbox.

The gearbox 326 comprises a sun wheel, or sun gear, 341, which is coupled to a rotor of the second motor 312*b*. Radially outwardly of the sun gear 341 and intermeshing therewith, in a conventional manner, is a plurality of planet gears 342 that are coupled together by a planet carrier 343. The planet carrier 343 constrains the planet gears 343 to rotate about their own axis. The planet carrier 343 is coupled to a stationary support in the form of the fan nacelle 318, such that the planet carrier is prevented from rotating. Radially outwardly of the planet gears 342 and intermeshing therewith is an annulus or ring gear 344 that is coupled via linkages to the first motor 321*a*, and therefore to the first fan 313*a*.

Such an epicyclic gearbox 326, in which a sun gear is coupled to an input, a ring gear is coupled to an output, and the planet carrier is stationary, is known as a star gearbox. A star gearbox provides for a reduction in speed of the output relative to the input, while also providing for contra-rotation.

Consequently, the first and second fans 313*a*, 313*b* contra-rotate at different speeds, while being driven by the motors 312*a*, 321*b*. Again, the majority of the torque is applied by the motors 321*a*, 321*b*, rather than being transmitted through the gearbox 326, with the gearbox only acting to maintain synchronicity between the first and second motors 321*a*, 321*b*, such that they can be powered by the same motor controller 325.

Consequently therefore, two contra-rotating fans can be provided, which can each be powered by respective electric motors 321*a*, 321*b*. Contra-rotation allows for an outlet guide vane between the fans 313*a*, 313*b* to be omitted, thereby decreasing weight. At the same time, the synchronicity between the first and second motors 321*a*, 321*b* ensured by the gearbox 326 allows for only a single motor controller to be used, thereby greatly decreasing weight further. Depending on the sizes of the sun 341, planet 342 and ring gears A further advantage may also be provided. Optionally, the gearbox 326 may be rated to accommodate the full torque/power rating required to transmit power to the first fan 313*a* from the second motor 321*b*, and/or to the second fan 313*b* from the first motor 321*a*, albeit for a short period. Consequently, in the event of a failure of one of the motors 321*a*, 321*b*, both fans can continue to be powered, either at full power for a short duration, or at a reduced power for a longer duration, by transmitting torque from one motor 321, 321*b* to both fans 313*a*, 313*b* via the gearbox 326. Consequently, thrust can continue to be produced efficiently, thereby reducing the consequences of a motor failure. On the other hand, in the event of a gearbox failure, both fans can continue to operate, though with reduced efficiency, as synchronicity is no longer maintained.

Figure 10:
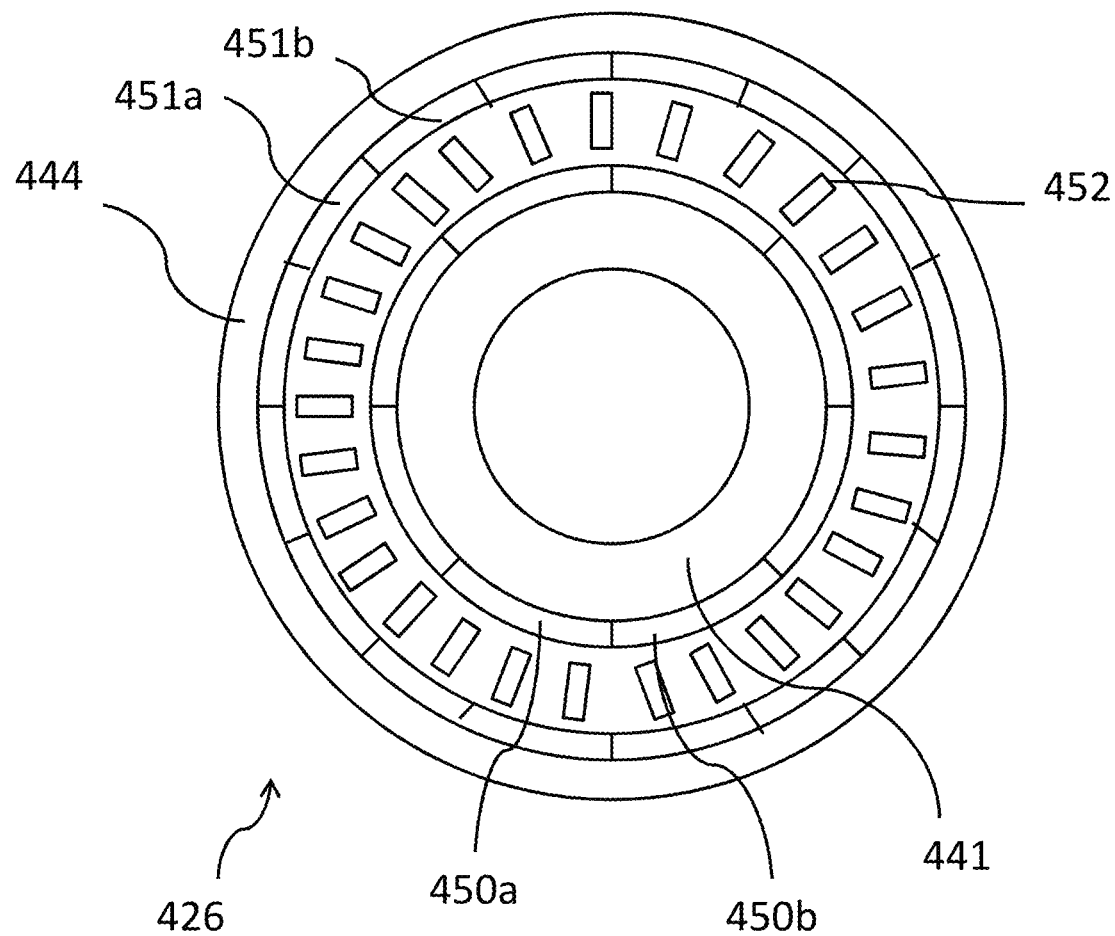
FIG. 10 is a sectional front view of an alternative gearbox for the electric propulsor of FIG. 8.

FIG. 10 shows an alternative gearbox 426, which may be used in place of the gearbox 26 or 326. The gearbox 426 comprises two rings 441, 444 of permanent magnets 450*a*, 450*b*, 451*a*, 451*b*, with a ring of steel pole pieces 452 in between. The orientation of the permanent magnets 450*a*, 450*b* alternate about the circumference of the ring 441, with the magnet 450*a* having the opposite North-South orientation to the magnet 450b. Similarly, the orientation of the permanent magnets 451a, 451b alternate about the circumference of the ring 444, with the magnet 451a having the opposite north-south orientation to the magnet 451b The steel pole 452 pieces act as flux paths from each of the rings of magnets 441, 444. This has the effect of creating harmonics in the fields produced by each ring of magnets. By careful selection of pole numbers, one can couple to the harmonic field and this creates a gear ratio. The behaviour of this gear is similar to the star gearbox 326. Consequently, the inner ring 441 acts in a similar manner to the sun gear 341, and so is coupled to the rotor of the second motor 312b. The steel pole pieces 452 take the place of the planet carrier 343, and so these are held still. The outer ring of magnets 44 takes the place of the ring gear 344, and so is coupled to the rotor of the first motor 312a. The ratios of magnets 450a, 450b, 451a, 451b and pole pieces 452 defines the gear ratio to define a magnetic gearbox.

Magnetic gearboxes can have high efficiency, and long lives, due to the lack of contacting gear teeth. One drawback of magnetic gearboxes however is the relatively low torque capacity of such devices. However, in the present disclosure, the torque transmitted through the gearbox 426 is relatively low, and so a magnetic gearbox may be suitable.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, one or more shafts may be provided, in addition to the motors or generators, to couple compressors and turbines. The electric compressors could be provided independently of the electric turbines. Other types of electric motors could be used. The invention could be applied to other types of turbomachinery, such as pumps and propellers.

Different types of electric machine could be employed, such as wound field, induction or synchronous reluctance machines, acting as either motors or generators.

A still further alternative would be the use of a coupling arrangement in the form of a magnetic gearbox, in place of the mechanical gearboxes described herein. A magnetic gearbox may be lighter weight, and less subject to wear in failure, in view of the lack of contacting parts.

The invention claimed is:

1. Turbomachinery comprising:
    first and second sets of rotors of a contra-rotating compressor configured to operate on a working fluid;
    combustion equipment configured to mix fuel with the working fluid and combust a mixture of the working fluid and the fuel;
    first and second sets of electric motors coupled to the respective first and second rotors;
    a common motor controller configured to:
        control the first set of electric motors to impart rotational force on the first rotors; and
        control the second set of electric motors to impart rotational force on the second rotors; and
    a coupling arrangement arranged to couple adjacent rotors of the first and second sets of rotors to provide for fixed ratio synchronized contra-rotation of the first and second sets of rotors.

2. Turbomachinery according to claim 1, wherein the turbomachinery comprises a turbine.

3. Turbomachinery according to claim 1, wherein the coupling arrangement comprises a mechanical gearing arrangement, which mechanically couples rotors of the first set of rotors with an adjacent rotor of the second set of rotors.

4. Turbomachinery according to claim 3, wherein the coupling arrangement comprises a contra-rotating epicyclic gearbox.

5. Turbomachinery according to claim 3, wherein the coupling arrangement comprises a ring gear mounted to each of the first and second rotors and a pinion gear arranged to mesh with the ring gears.

6. Turbomachinery according to claim 1, wherein each electric motor comprises a radial flux electric machine comprising a stator and a rotor.

7. Turbomachinery according to claim 6, wherein the stator of each electric motor is provided radially inward of the rotor.

8. Turbomachinery according to claim 1, wherein rotors of adjacent electric motors comprise a different number of magnetic poles relative to one another.

9. Turbomachinery according to claim 4, wherein the contra-rotating epicyclic gearbox comprises a star gearbox.

* * * * *